United States Patent
Russell et al.

(10) Patent No.: US 11,493,480 B2
(45) Date of Patent: Nov. 8, 2022

(54) METHOD AND APPARATUS FOR THE DETECTION OF CORROSION UNDER INSULATION (CUI), CORROSION UNDER FIREPROOFING (CUF), AND FAR SIDE CORROSION ON CARBON STEEL PIPING AND PLATES

(71) Applicant: Russell NDE Systems Inc., Edmonton (CA)

(72) Inventors: David E. Russell, Edmonton (CA); Yuwu Yu, Edmonton (CA); Hoan Nguyen, Edmonton (CA); Brian Thai, Edmonton (CA); Daniel Lingnau, Edmonton (CA); Ellen Jin, Edmonton (CA)

(73) Assignee: Russell NDE Systems Inc., Edmonton (CA)

( * ) Notice: Subject to any disclaimer, the term of this patent is extended or adjusted under 35 U.S.C. 154(b) by 0 days.

(21) Appl. No.: 17/068,448

(22) Filed: Oct. 12, 2020

(65) Prior Publication Data
US 2022/0113283 A1 Apr. 14, 2022

(51) Int. Cl.
*G01N 27/904* (2021.01)
*G01N 27/87* (2006.01)

(52) U.S. Cl.
CPC ........... *G01N 27/904* (2013.01); *G01N 27/87* (2013.01)

(58) Field of Classification Search
CPC .......................................... G01N 27/90–9093
USPC .................................. 324/228–231, 239–243
See application file for complete search history.

(56) References Cited

U.S. PATENT DOCUMENTS

| 4,843,319 | A | 6/1989 | Lara |
| 5,506,503 | A | 4/1996 | Cecco et al. |
| 5,963,030 | A | 10/1999 | Stark |
| 6,327,921 | B1 | 12/2001 | Hsu et al. |
| 6,429,650 | B1 | 8/2002 | Kwun et al. |
| 6,497,159 | B1 | 12/2002 | Lavoie |
| 6,595,061 | B2 | 7/2003 | Gorman et al. |
| 6,680,619 | B1 | 1/2004 | Horn |
| 7,284,456 | B2 | 10/2007 | Lavoie |

(Continued)

FOREIGN PATENT DOCUMENTS

| JP | 9-196876 A2 | 7/1997 | |
| JP | 2017138099 A * | 8/2017 | ............. G01N 27/82 |
| WO | 2015061487 A2 | 4/2015 | |

OTHER PUBLICATIONS

Jentek Sensors, Inc., Advancements in Imaging Corrosion Under Insulation (CUI) for Piping and Vessels, ASNT Annual Conference Nov. 4-7, 2013, Las Vegas, NV, copyright 2013, 22 pages.

(Continued)

*Primary Examiner* — Melissa J Koval
*Assistant Examiner* — Rahul Maini
(74) *Attorney, Agent, or Firm* — Christensen O'Connor Johnson Kindness PLLC

(57) ABSTRACT

A probe including a plurality of links connected together in series, wherein the plurality of links create a flexible compartment containing at least a first and second exciter means and at least one pair of detector means, wherein the exciter means are driven by an alternating current to produce an alternating magnetic field, and the detector means are configured to detect the magnetic field of an induced eddy current caused by the exciter means magnetic field.

18 Claims, 15 Drawing Sheets

(56) References Cited

U.S. PATENT DOCUMENTS

| | | | |
|---|---|---|---|
| 7,301,335 B2 * | 11/2007 | Sun | G01N 27/82 |
| | | | 324/240 |
| 7,319,738 B2 | 1/2008 | Lasiuk et al. | |
| 7,467,057 B2 * | 12/2008 | Sheiretov | G01N 27/902 |
| | | | 702/127 |
| 7,514,918 B2 | 4/2009 | Crouzen | |
| 8,049,494 B2 * | 11/2011 | Lepage | G01N 27/904 |
| | | | 324/238 |
| 8,347,746 B2 | 1/2013 | Hafenrichter et al. | |
| 8,485,036 B2 | 7/2013 | Crumpton et al. | |
| 8,646,347 B2 | 2/2014 | Dubbeldam et al. | |
| 8,768,039 B2 | 7/2014 | Survant et al. | |
| 8,810,264 B2 | 8/2014 | Bohon et al. | |
| 8,928,316 B2 | 1/2015 | Goldfine et al. | |
| 9,207,131 B2 | 12/2015 | Schlicker et al. | |
| 9,255,875 B2 | 2/2016 | Denenberg et al. | |
| 9,285,345 B2 * | 3/2016 | Boenisch | G01N 27/904 |
| 2002/0105325 A1 | 8/2002 | Goldfine et al. | |
| 2005/0127908 A1 | 6/2005 | Schlicker et al. | |
| 2007/0229066 A1 * | 10/2007 | Narishige | G01N 27/902 |
| | | | 324/240 |
| 2011/0127999 A1 * | 6/2011 | Lott | G01R 33/04 |
| | | | 324/239 |
| 2013/0124109 A1 | 5/2013 | Denenberg et al. | |
| 2016/0003734 A1 | 1/2016 | Mann et al. | |
| 2017/0241953 A1 * | 8/2017 | Kagawa | G01N 27/82 |

OTHER PUBLICATIONS

Y. Sheiretov, "Deep Penetration Magnetoquasistatic Sensors," Ph.D. thesis, Jun. 2001, 198 pages.

C. Ebersole, "ACTT Introduces the Bracelet Probe", NDT.org/NDT News, Dec. 13, 2013, <https://www.ndt.org/news.asp?ObjectID=51462>, 3 pages.

* cited by examiner

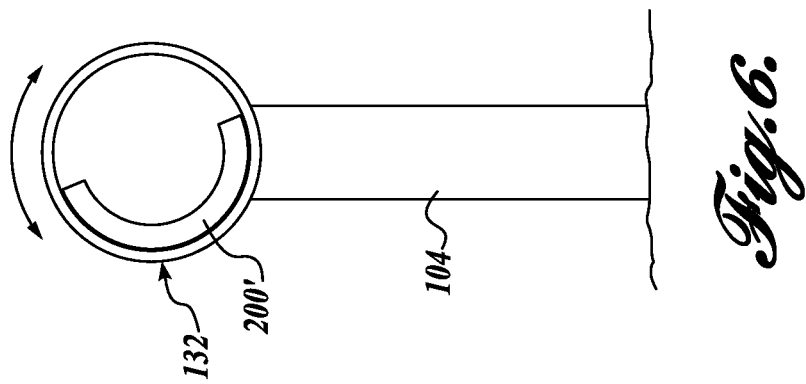
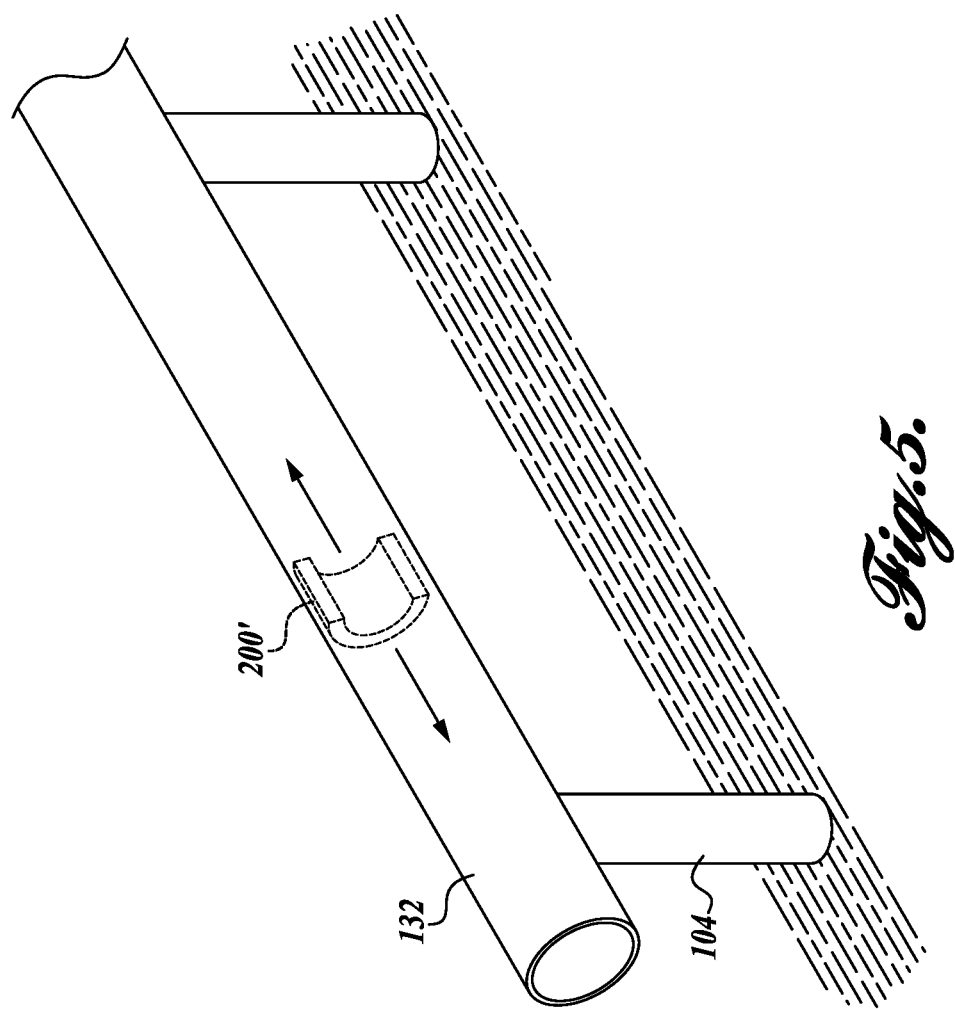

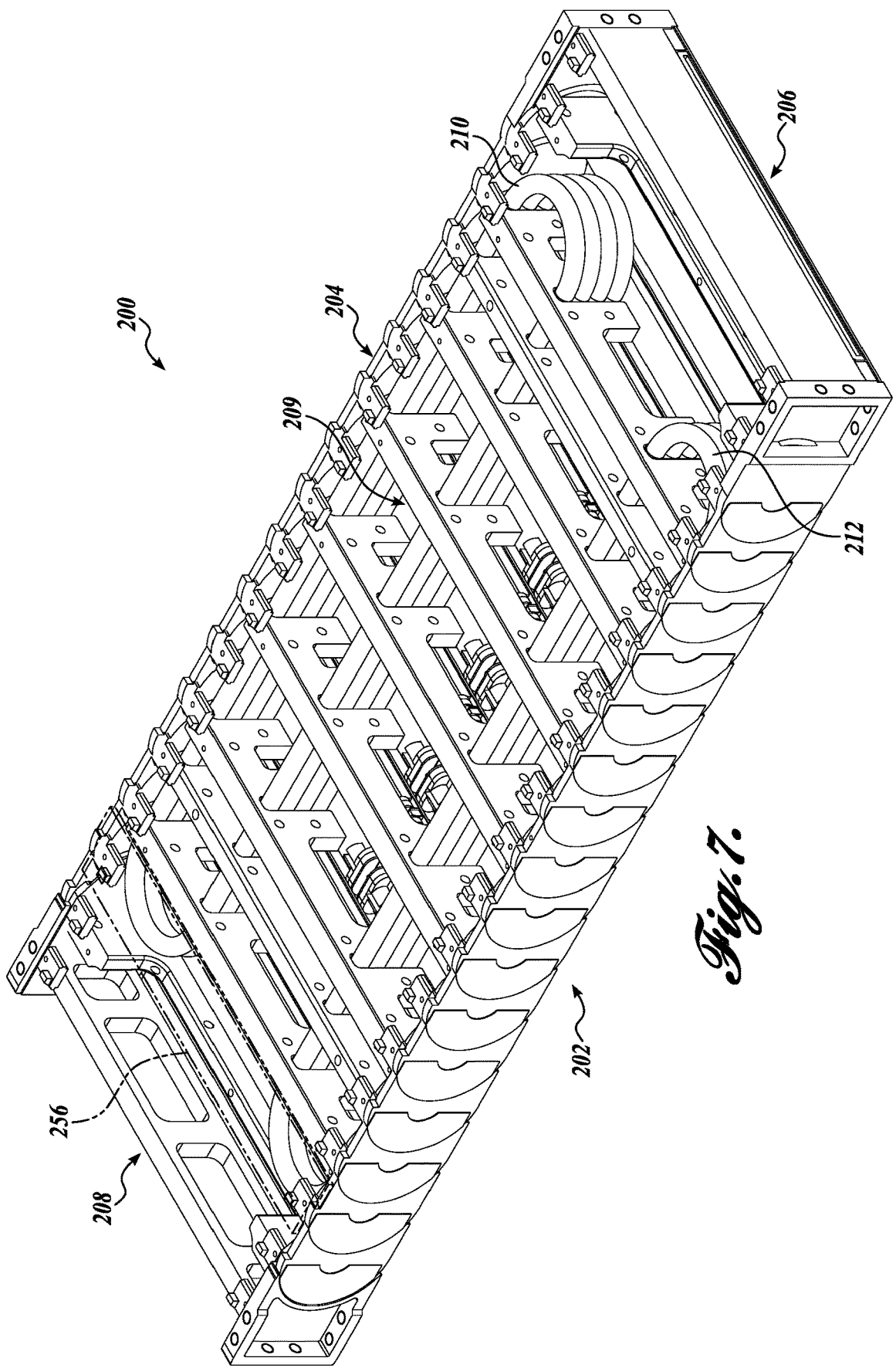

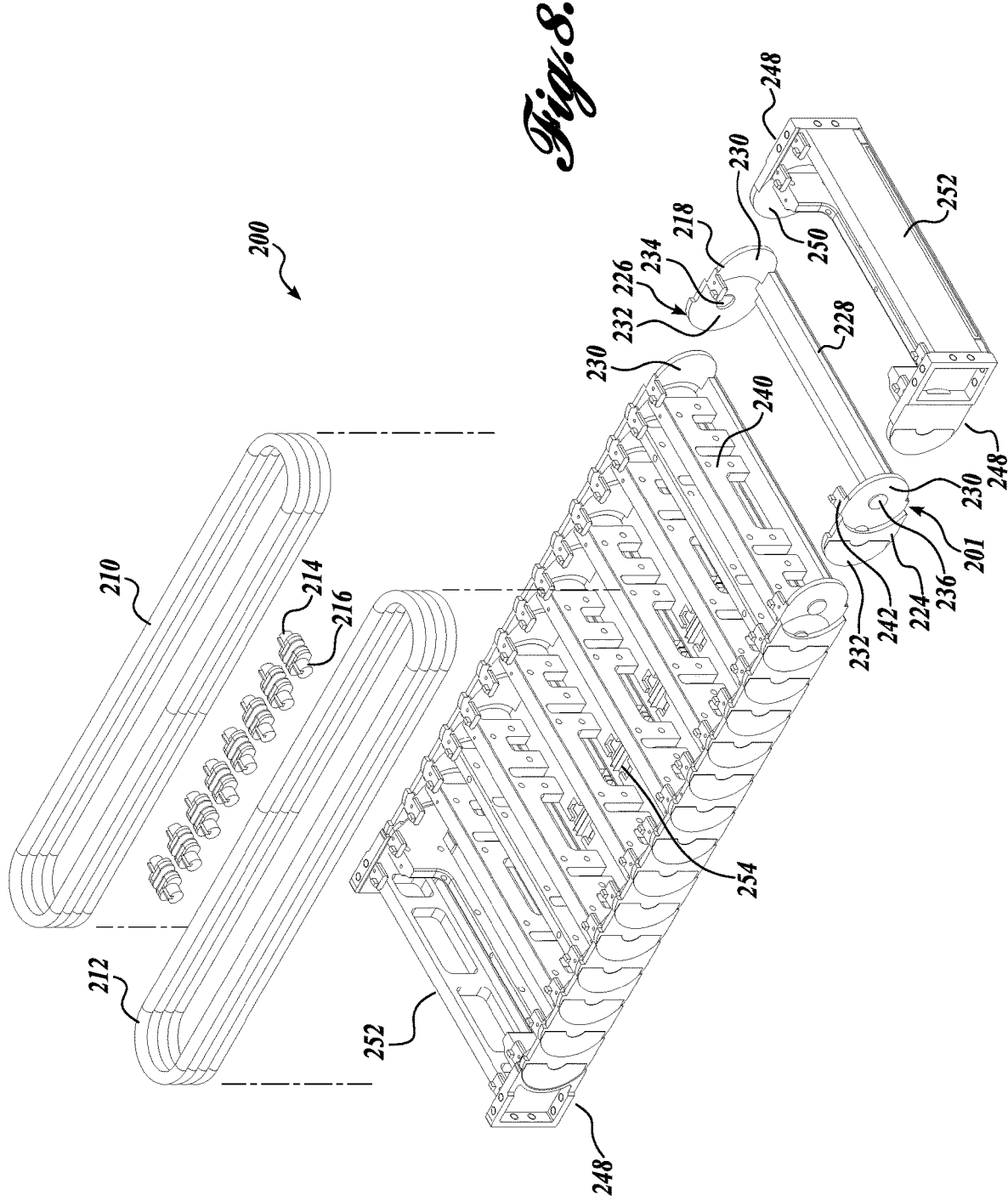

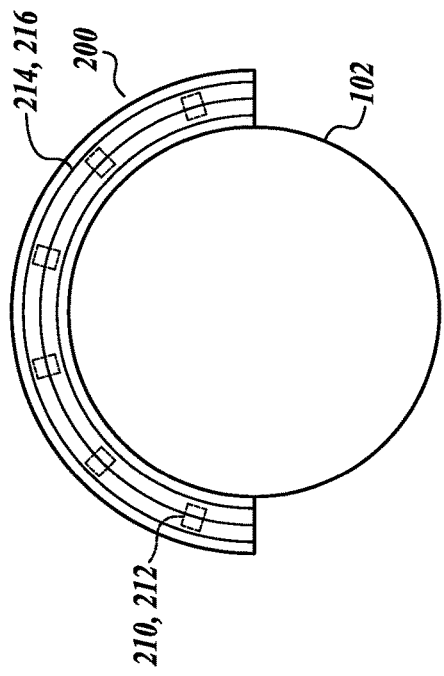
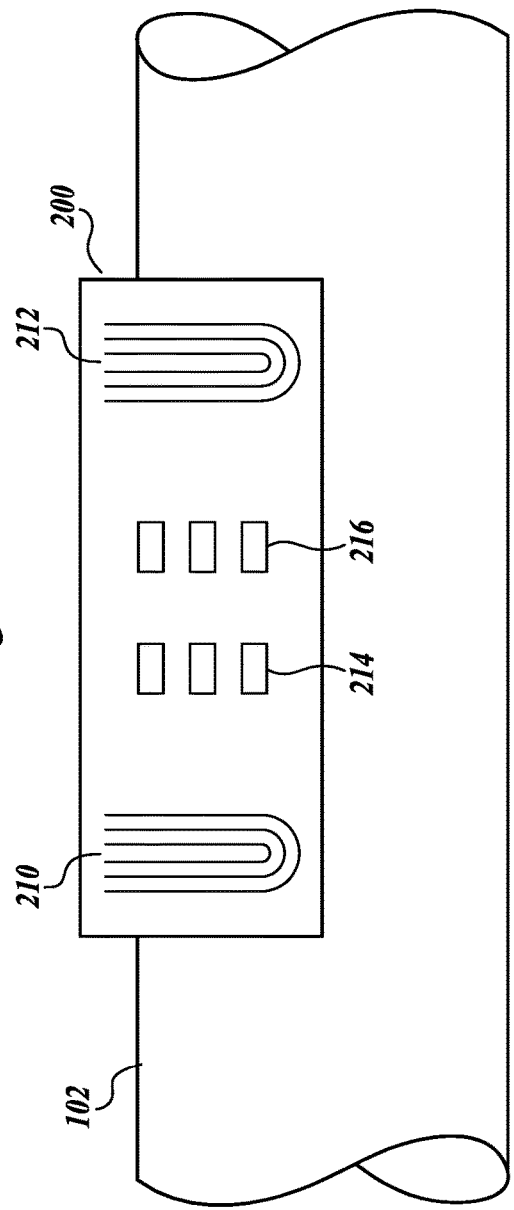

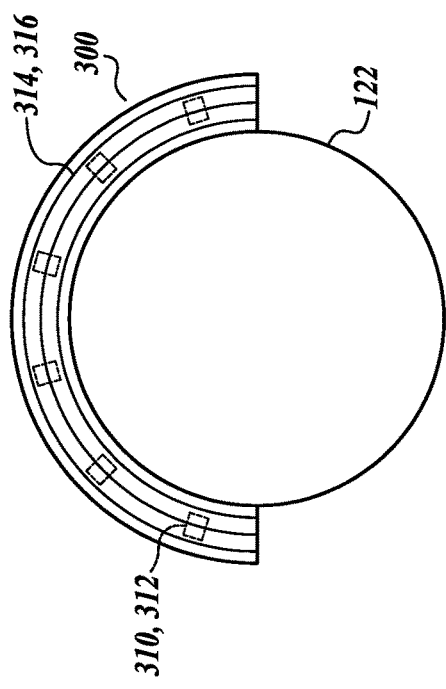
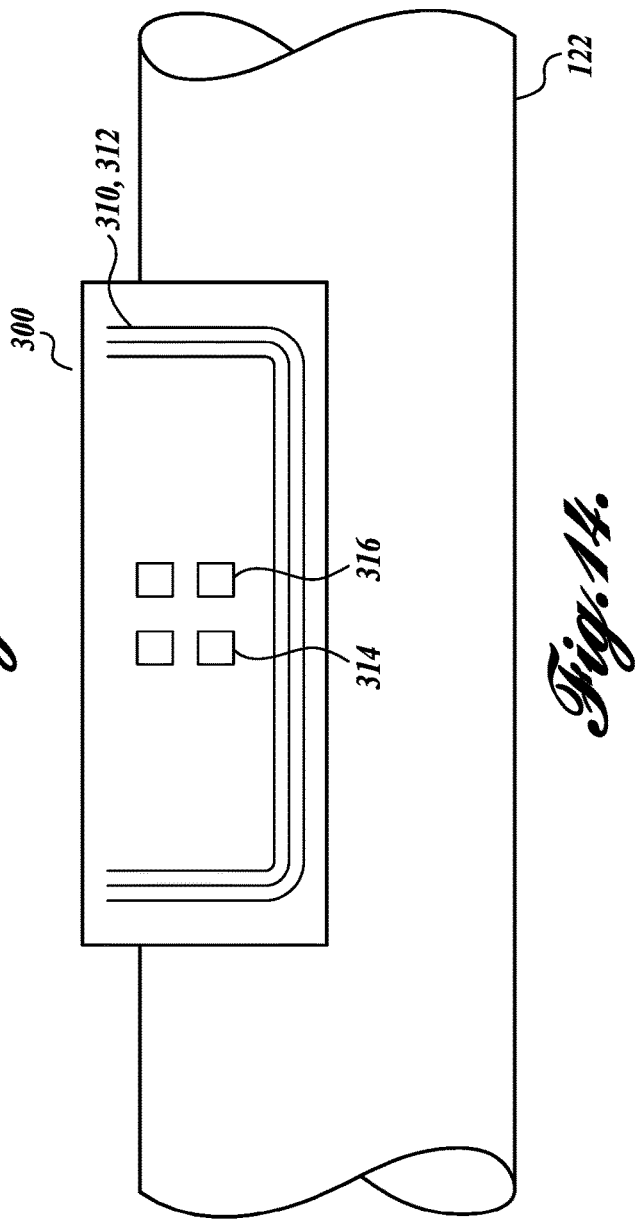
Fig. 13.
Fig. 14.

METHOD AND APPARATUS FOR THE DETECTION OF CORROSION UNDER INSULATION (CUI), CORROSION UNDER FIREPROOFING (CUF), AND FAR SIDE CORROSION ON CARBON STEEL PIPING AND PLATES

BACKGROUND

Corrosion affects many kinds of metals. Corrosion that occurs in metals covered with insulation, fireproofing, and jacketing ("coverings"), or is on the inside of a pipe, vessel, storage tank ("Component") etc. It is usually hidden from the eye and has led to failures of critical components in refineries and processing plants. The main cause of corrosion under insulation (CUI) is water seeping underneath the covering and then reacting with the steel pipe, tank, storage sphere leg or pressure vessel. Removing the covering to inspect for corrosion is a costly and time-consuming process, so any inspection technique that can sense wall loss under the coverings, or on the inside of the component would be of significant value to many industries. Three specific probe configurations are described which use a low frequency "through transmission field measurement" (TTFM). For coverings with a thickness less than the metal wall thickness a "Bare Pipe Probe Configuration" is employed which is sensitive to corrosion on the near side and far side of a carbon steel pipe or plate. For coverings with a thickness greater than the metallic pipe wall thickness a "CUI/CUF Probe Configuration" is employed, which is only sensitive to corrosion on the outside (probe side) of a pipe or plate. We use the term "Lift-Off" to define the measured distance separating the surface of the metallic pipe to the probe, A bare pipe would be considered a "Low Lift-off" application. An insulated pipe may have a covering thickness anywhere from ½" thick to 4 inches thick, or more. This would be referred to as a "High Lift-off application".

A third application of the technique is for the detection of broken "pre-stress wires" in "Embedded Cylinder Pre-Stressed Concrete Cylinder" (PCCP) pipes, through the external concrete covering which can be 1" to 4" thick.

Various corrosion detection methods have been developed for detecting corrosion under insulation (CUI) and corrosion under fireproofing (CUF). Radiographic imaging is a slow, dangerous, and expensive technique. A thermal imaging technique claims to detect water in the insulation and a pulsed eddy current technique has been available for many years, but is a relatively "large footprint" technique that has poor sensitivity to small areas of loss of wall.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a probe is provided for detecting the condition of pipes, vessels, tanks, and other structure that may or may not be covered with insulation, fireproofing, or other jacketing. The probe includes a plurality of links connected together in series, wherein the plurality of links create a flexible compartment containing at least a first and second exciter means and at least one pair of detector means, wherein the exciter means are driven by an alternating current to produce an alternating, sinusoidal magnetic field, and the detector means are configured to detect a magnetic field of an eddy current caused by the exciter means induced magnetic field.

In any of the embodiments described herein, wherein the detector means are placed at a distance from the exciter means, wherein a dominant field detected by the detector means is the exciter means induced eddy current magnetic field.

In any of the embodiments described herein, comprising a first exciter means adjacent to a side wall of the probe compartment, a second exciter means adjacent an opposite side wall of the probe compartment, and a plurality of detector means pairs placed between the first and second exciter means.

In any of the embodiments described herein, wherein the first exciter means occupies about one third to one fourth of a width of the compartment, the second exciter means occupies about one third to one fourth of the width of the compartment, and a plurality of detector means pairs are placed along the center of the compartment.

In any of the embodiments described herein, comprising a first exciter means that extends adjacent to a first side wall, an opposite side wall, a first end wall, and a second end wall of the probe compartment, a second exciter means placed inside and adjacent of the first exciter means, and a plurality of detector means pairs placed within the second exciter means.

In any of the embodiments described herein, wherein the plurality of detector means pairs are placed along the center of the compartment.

In any of the embodiments described herein, comprising a first exciter means placed adjacent a first end wall of the probe compartment, a second exciter means placed adjacent a second end wall of the probe compartment, and a plurality of detector means pairs placed between the first and the second exciter means.

In any of the embodiments described herein, wherein the first exciter means is adjacent to a first side wall and adjacent to an opposite second side wall of the compartment, the second exciter means is adjacent to the first side wall and adjacent to an opposite second side wall of the compartment, and a plurality of detector means pairs are placed along the center of the compartment.

In any of the embodiments described herein, wherein the alternating current frequency is sub 1 hertz to 100 Hz.

In accordance with one embodiment of the present disclosure, a method is provided for detecting defects in a structure. The method includes placing the probe of claim 1 on an exterior of a structure; moving the probe on the structure in a direction; while moving the probe, producing an alternating magnetic field with exciter means driven by an alternating current and detecting a magnetic field of an induced eddy current caused by the alternating magnetic field with detector means.

In any of the embodiments described herein, wherein the direction includes a longitudinal direction or circumferential direction or both longitudinal and circumferential direction.

In any of the embodiments described herein, wherein the structure is made from carbon steel.

In any of the embodiments described herein, wherein the alternating current frequency is sub 1 hertz to 100 Hz.

In any of the embodiments described herein, wherein the detector means are placed at a distance from the exciter means, wherein a dominant field detected by the detector means is the induced eddy current magnetic field.

In any of the embodiments described herein, wherein the exterior of the structure is lacking insulation or fireproofing, and the probe comprises a first exciter means adjacent to a side wall of the probe compartment, a second exciter means adjacent an opposite side wall of the probe compartment, and a plurality of detector means pairs placed between the first and second exciter means.

In any of the embodiments described herein, wherein the first exciter means occupies about one third to one fourth of the width of the compartment, the second exciter means occupies about one third to one fourth of the width of the compartment, and a plurality of detector means pairs are placed along the center of the compartment.

In any of the embodiments described herein, wherein the exterior of the structure has insulation or fireproofing, and the probe comprises a first exciter means that extends adjacent to a first side wall, an opposite side wall, a first end wall, and a second end wall of the probe compartment, a second exciter means placed inside and adjacent of the first exciter means, and a plurality of detector means pairs placed within the second exciter means.

In any of the embodiments described herein, wherein a plurality of detector means pairs are placed along the center of the compartment.

In any of the embodiments described herein, wherein the structure includes a tubular structure and the probe wraps around the tubular structure for less than an entire circumference of the structure.

In any of the embodiments described herein, wherein the probe includes a plurality of links connected together in series making the probe flexible along a length of the probe.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5 and 6 are diagrammatical illustrations of a probe displaced internally within a pipe or pipeline, vessel or storage tank. This probe detects nearside (internal) or far side (external) corrosion or wall-loss on bare material or material that is coated or covered with insulation or cement mortar or other lining. The probe can be scanned axially or circumferentially inside the pipe;

FIG. 7 is a diagrammatical illustration of one embodiment of a probe to detect corrosion;

FIG. 8 is an exploded view of the probe of FIG. 7;

FIGS. 9 and 10 are schematic illustrations of the probe of FIG. 7 mounted on a pipe;

FIGS. 13 and 14 are schematic illustrations of the probe of FIG. 11 mounted on a pipe;

DETAILED DESCRIPTION

Figure 2:
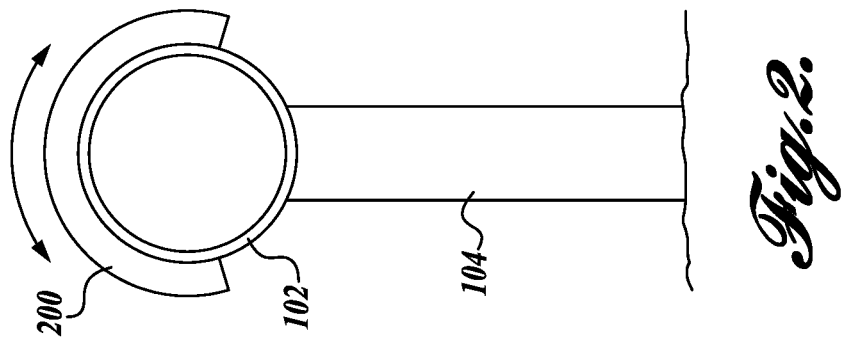
FIGS. 1 and 2 are diagrammatical illustrations of a probe to detect corrosion on a bare or coated (rather than an insulated or covered) pipe, vessel, tank, sphere leg etc. i.e. the probe can detect "near side and far side corrosion"

Through Transmission Field Measurement (TTFM) is a method of non-destructive testing that uses at least one exciter means and at least one detector means separated by a small distance (2" to 10") proximal to a pipe, pressure vessel, tank, or sphere leg to assess the condition and whether there is any corrosion or wall loss defects in the material. An exciter means generates an alternating magnetic field which couples to the ferrous metal component and induces eddy currents which in turn generate their own magnetic fields. A detector means is placed at a distance separated from the exciter means to detect the magnetic field of the eddy currents. The detector means are positioned where the magnetic field from the eddy currents is dominant, so that it remains generally unaffected by the magnetic field from the exciter means but can still adequately measure the field strength from the eddy currents. On the other hand, the probes used in eddy-current testing (ECT) have means that create a magnetic field and detect the eddy currents in the part within a closely spaced area. Generally, TTFM probes produce a magnetic field and eddy currents that travel through the component wall and are detected by a detector means that may be on the far side of the component wall, or may be on the near-side of the component wall.

Over the past several decades a number of new types of magnetic sensors have been developed which effectively have the capability of detecting magnetic fields similar to conventional means. A MEMSIC Anisotropic Magneto-Resistive (AMR) magnetic sensor is one such type.

Other approaches for magnetic field sensing, include Hall effect sensor, magneto-diode, magneto-transistor, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor, optically pumped magnetic field sensor, fluxgate magnetometer, search means magnetic field sensor and SQUID magnetometer.

The placement of the sensor means relative to the exciter means includes consideration of the interactions of the magnetic fields with the structure being tested. In one embodiment, certain configurations of exciter means and detector means are preferred for non-insulated structures, while certain other configurations of exciter means and detector means are preferred for insulated structures. The direct magnetic field interacts with the magnetic domains in a ferromagnetic pipe to be inspected. As it does so, then unique electro-magnetic field perturbations emanate from the localized areas of corrosion wall loss in the pipe. Both the probes for testing non-insulated pipe and insulated (CUI/CUF) pipe have strategically placed detector means which are able to detect and record these localized field perturbations.

These perturbations are then processed in such a way as to differentiate their signals from both the background magnetic fields present in the general vicinity of the probe (for example, fields from electrical equipment or motors that are nearby) and also the baseline magnetic fields of the non-corroded (virgin) piping infrastructure. The signals are then analyzed in reference to calibration defects, either simulated defects that are machined into a separate calibration pipe or by using a natural corrosion defect in a pipe for which the defect morphology (length, width, depth, etc.) can be physically measured.

A probe and method for the detection of corrosion of insulated or fireproofed and/or non-insulated metal pipes, conduits, tanks, vessels, and the like, are disclosed. In one embodiment, the probe uses the theory of through transmission similar to remote field testing, however, in the embodiments herein the probes may be located on the exterior or interior of the component. In one embodiment, the probe is used to detect corrosion of structures containing iron or iron alloys. In one embodiment, the probe is used to detect corrosion of structures containing cast iron or carbon steel. In one embodiment, the probe is used in detecting corrosion of ferromagnetic alloys. In another configuration, the probe may be used to detect broken pre-stress wires in PCCP pipe.

In this description, a piping structure is used to illustrate certain aspects of the probe. However, it is understood that a pipe is merely representative of one application of the probe. Embodiments of the probe can be used on structures besides pipes, such as tanks or vessels. Furthermore, the pipe or vessels can be non-insulated or insulated pipe or fireproofed pipe. This disclosure describes that a probe for testing a non-insulated pipe has a different configuration of means compared to a probe designed for inspecting an insulated pipe.

Figure 1:
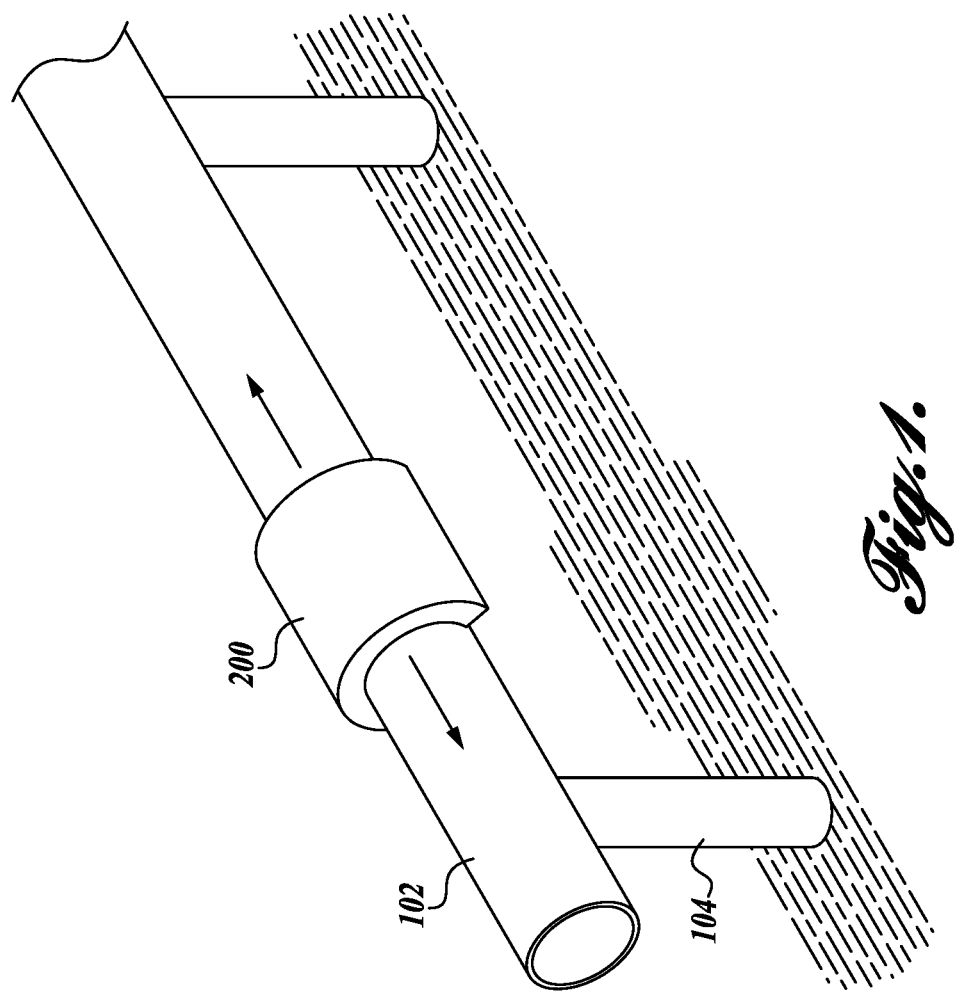

Referring to FIGS. 1 and 2, a diagrammatical illustration of a probe 200 is illustrated mounted to a pipe 102. The probe 200 is shown schematically in order to represent various embodiments of the probes described herein. The general construction of the probe 200 includes a plurality of linked sections that allow the probe 200 to bend to assume the curvature of the structure that is to be inspected. However, flat structures having no curvature can also be inspected by the probe 200.

As seen in FIG. 2, in an embodiment, the probe 200 does not fully encircle the pipe 102 in order to allow the probe 200 to move forwards and backwards along the length of the pipe structure 102 as shown in FIG. 1 when the pipe 102 is supported on posts 104. Because in one embodiment, the probe 200 does not fully encircle the pipe structure 102, the probe 102 can rotate to clockwise or counterclockwise to inspect the full circumference of the pipe 102. In this manner, the probe 200 can move the entire length of that pipe as well as move entirely around its circumference.

The mechanisms that move that probe 200 along the length of the pipe and that rotate the probe 200 around the circumference of the pipe 102 include wheels, which may be motorized if desired, on the probe or a system of cables that pull the probe 200 in either direction. The mechanisms for moving the probe 200 along the length and rotating the probe 200 are conventionally known.

FIGS. 7 and 8 show a sensor configuration for testing bare pipe and other structures that are not encased in insulation or fireproofing. FIGS. 7 and 8 show that the sensor is in the form of probe 200 that includes a plurality of links 201 attached in series to one another. The links 201 are rotatable relative to each other to allow the probe 200 to wrap around a curved structure, such as a pipe. The links 201 cooperate to form a compartment for the placement of exciter means and detector means. The probe 200 compartment includes a first side wall 202, an opposite side wall 204, a first end wall 206, and an opposite end wall 208. The probe also includes a bottom or floor 209 defined by the links and top or cover 220 that is composed of individual segments 222 corresponding to each of the links.

As shown in FIG. 8, each of the links 201 is constructed with sidewall sections 224 and 226 separated by a floor section 228. Each of the sidewall sections 224 and 226 are composed of a first arcuate subsection 230 which is slightly inwardly offset from the second substantially circular subsection 232 which is slightly outwardly offset from the first arcuate subsection 230. With this construction the subsection 232 overlaps a substantial portion of the adjacent arcuate subsection 230 of the adjacent link 201. A shallow counterbore 234 is centrally positioned relative to the subsection 232 to receive a close-fitting circular stub axle 236 projecting outwardly from the adjacent arcuate subsection 230 of the adjacent link 201. By this construction, the links 201 are securely joined together as well as able to pivot relative to each other while maintaining a closed housing for protecting the electrical compliments of the probe.

Each of the links 201 also includes a transverse partition wall 240 which spans between the sidewalls 224 and 226. The ends of the transfers walls 240 are attached to tabs 242 extend laterally inwardly from the upper edge of the sidewalls 224, 226. As can be appreciated, the transfers walls 240 adds structural integrity to the structure of the probe 200.

The end walls 206 and 208 are constructed somewhat similarly to the links 201 in the sense that each of the end walls includes sidewalls 248 having an arcuate projecting section 250 corresponding to subsections 232 of the sidewalls 224 and 226 that mate with arcuate subsections 230 of an adjacent link. The end walls 206 and 208 also include an end panel 252 spanning between the sidewalls 248 to close off the ends of the probe 200. As shown in FIG. 7, a rotatable cover 256 is attached to the tabs 242 of each link structure 201 to close off the top of the probe structure. It will be appreciated that by the foregoing construction probe 200 constitutes a rugged, closed structure for housing the necessary electrical compliments of the probe described below.

Referring to FIG. 7, a first exciter means 210 is placed adjacent to the side wall 202. A second exciter means 212 is placed adjacent to the opposite side wall 204. The windings of first and second exciter means 210, 212 are oval shaped. In other words, the windings of the first and second exciter means 210, 212 extend nearly the entire length of the probe 200 in the length direction, and are only about one-third to one-fourth the width of the entire probe 200. Cutouts are formed in the partition walls to provide clearance for the windings of the first and second exciter means 210, 212.

The probe 200 includes a plurality of pairs of detector means. For example, detector means 214 is paired with detector means 216. The detector axes vs. exciter axis must be oriented correctly for each type of probe; insulated pipe versus bare-pipe. Likewise, when a probe is designed for use on the inside surface of a pipe versus the outside of the pipe the orientation and relative positions of the exciter with respect to the detector/s must be tailored to the pipe application taking into account whether it is a high "Lift-Off" or low "Lift-Off" application. Some metallic pipes utilize either thin or thick internal coatings bonded to the inner surface of the pipe. In other cases, a separate thick liner may be pulled into the pipe in situ. Also, the orientation of the probe relative to the pipe axis is an important parameter. Each pair of detector means 214, 216 is placed between the first exciter means 210 and the second exciter means 212 (FIG. 8). The detector means are mounted on brackets 254 that are fixed to the floor sections 228. That is, the pairs of detector means lie outside of the exciter means windings but between the two exciter means. The pairs of detector means 214, 216 extend along the length of the exciter means 210, 212, and the pairs of detector means are further aligned along the length of the exciter means 210, 212. The magnetic field path is important for the probe to work properly in both the bare-pipe application and the CUI/CUF application.

FIGS. 9 and 10 show how the exciter and detector means are configured when the probe 200 is mounted on the exterior of a curved structure, such as pipe 102. In FIGS. 9 and 10, the windings of the exciter means 210, 212, assume a curved shape and the first exciter means 210 is at a different axial location than the second exciter means 212. In FIG. 10, the pairs of detector means 214, 216 are schematically shown between the first exciter means 210 and the second exciter means 212.

Referring to FIGS. 5 and 6, a diagrammatical illustration of a probe 200 is illustrated mounted within a pipe 132. The probe 200 is shown schematically in order to represent various embodiments of the probes described herein. The general construction of the probe 200 can be similar to probe 200, to include a plurality of linked sections that allow the probe 200 to bend to assume the curvature of the interior of the structure that is to be inspected. However, flat structures having no curvature can also be inspected by the probe 200.

As seen in FIG. 6, in an embodiment, the probe 200 does not fully encircle the interior of the pipe 132 in order to allow the probe 200 to move forwards and backwards along the length of the pipe structure 132 as shown in FIG. 6 and avoid structures or features within the pipe. Because the probe 200 does not fully encircle the pipe structure 132, the probe 200 can rotate to clockwise or counterclockwise to inspect the full circumference of the pipe 132. In this manner, the probe 200 can move the entire length of the pipe 132 as well as move entirely around its interior circumference.

The mechanisms that move that probe 200 along the length of the pipe 132 and that rotate the probe 200 around the circumference of the pipe 132 include wheels, which may be motorized if desired, on the probe or a system of cables that pull the probe 200 in either direction. The mechanisms for moving the probe 200 along the length and rotating the probe 200 are conventionally known.

Figure 4:
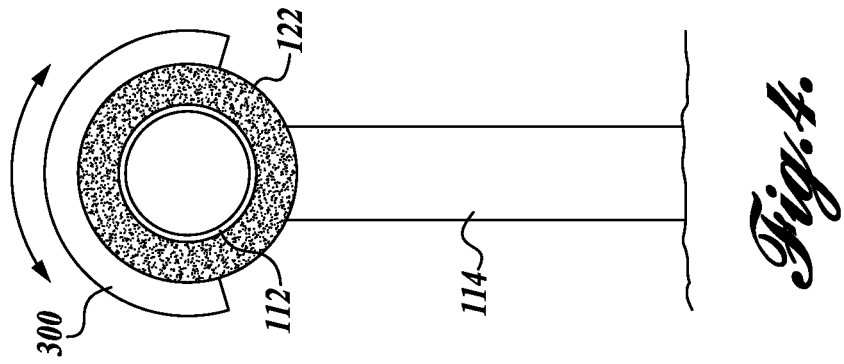
FIGS. 3 and 4 are diagrammatical illustrations of a probe to detect corrosion on a "covered" pipe, vessel, tank, sphere leg etc. i.e. "Corrosion Under Insulation" (CUI) or Corrosion under Fireproofing (CUF)
Figure 3:
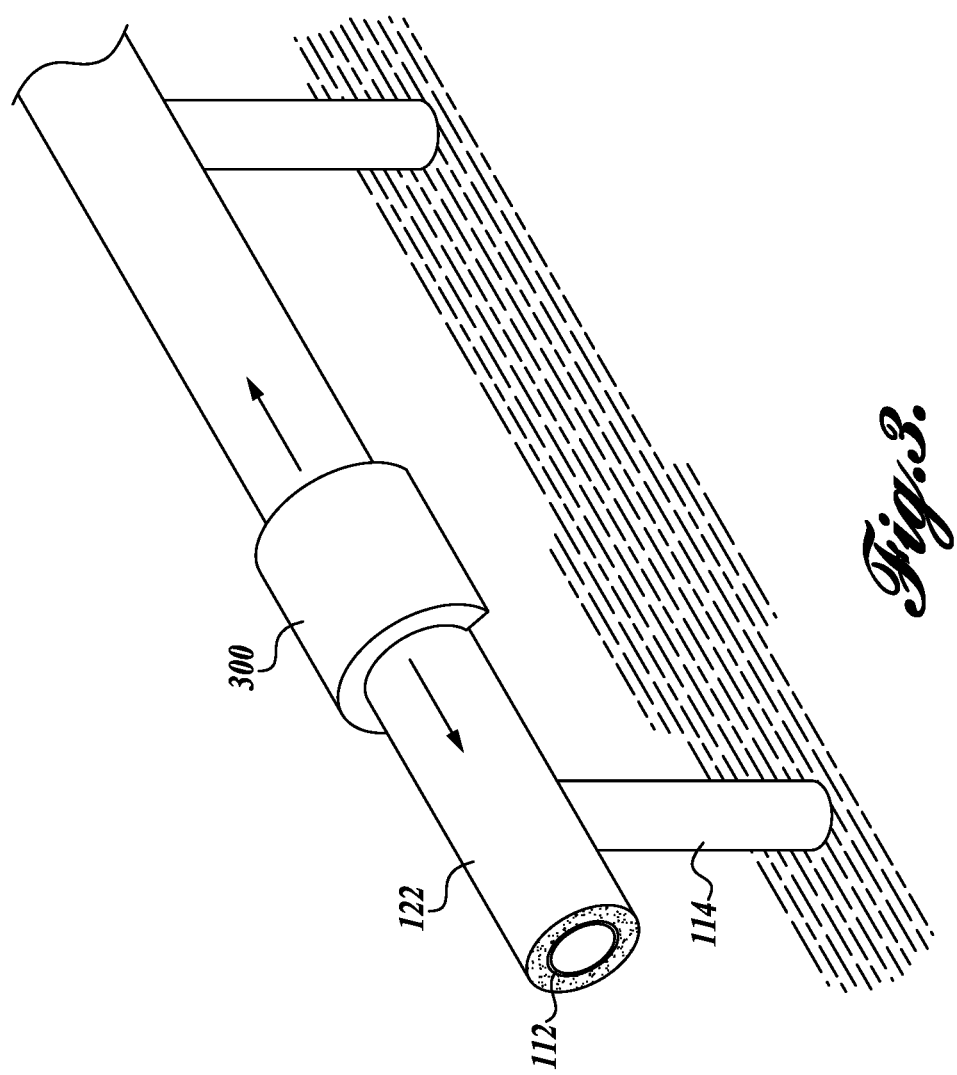

Referring to FIGS. 3 and 4, a diagrammatical illustration of a probe 300 is illustrated mounted to a pipe 112 that is enclosed within covering 122 that may be composed of insulation, fireproofing, and jacketing. The probe 300 is shown schematically in order to represent various embodiments of the probes described herein. The general construction of the probe 300 includes a plurality of linked sections that allow the probe 300 to bend or flex to assume the curvature of the structure that is to be inspected. However, flat structures having no curvature can also be inspected by the probe 300.

As seen in FIG. 4, in an embodiment, the probe 300 does not fully encircle the pipe 112 in order to allow the probe 300 to move forwards and backwards along the length of the pipe structure 112, as shown in FIG. 3, for example, when the pipe 112 is supported on posts 114. Because in one embodiment, the probe 300 does not fully encircle the pipe structure 112, the probe 300 can rotate to clockwise or counterclockwise to inspect the full circumference of the pipe 112. In this manner, the probe 300 can move the entire length of the pipe 112 as well as move entirely around its circumference.

The mechanisms that move that probe 300 along the length of the pipe 112 and that rotate the probe 300 around the circumference of the pipe 112 include wheels, which may be motorized if desired) on the probe or a system of cables that pull the probe 300 in either direction. The mechanisms for moving the probe 300 along the length and rotating the probe 300 are conventionally known.

Figure 11:
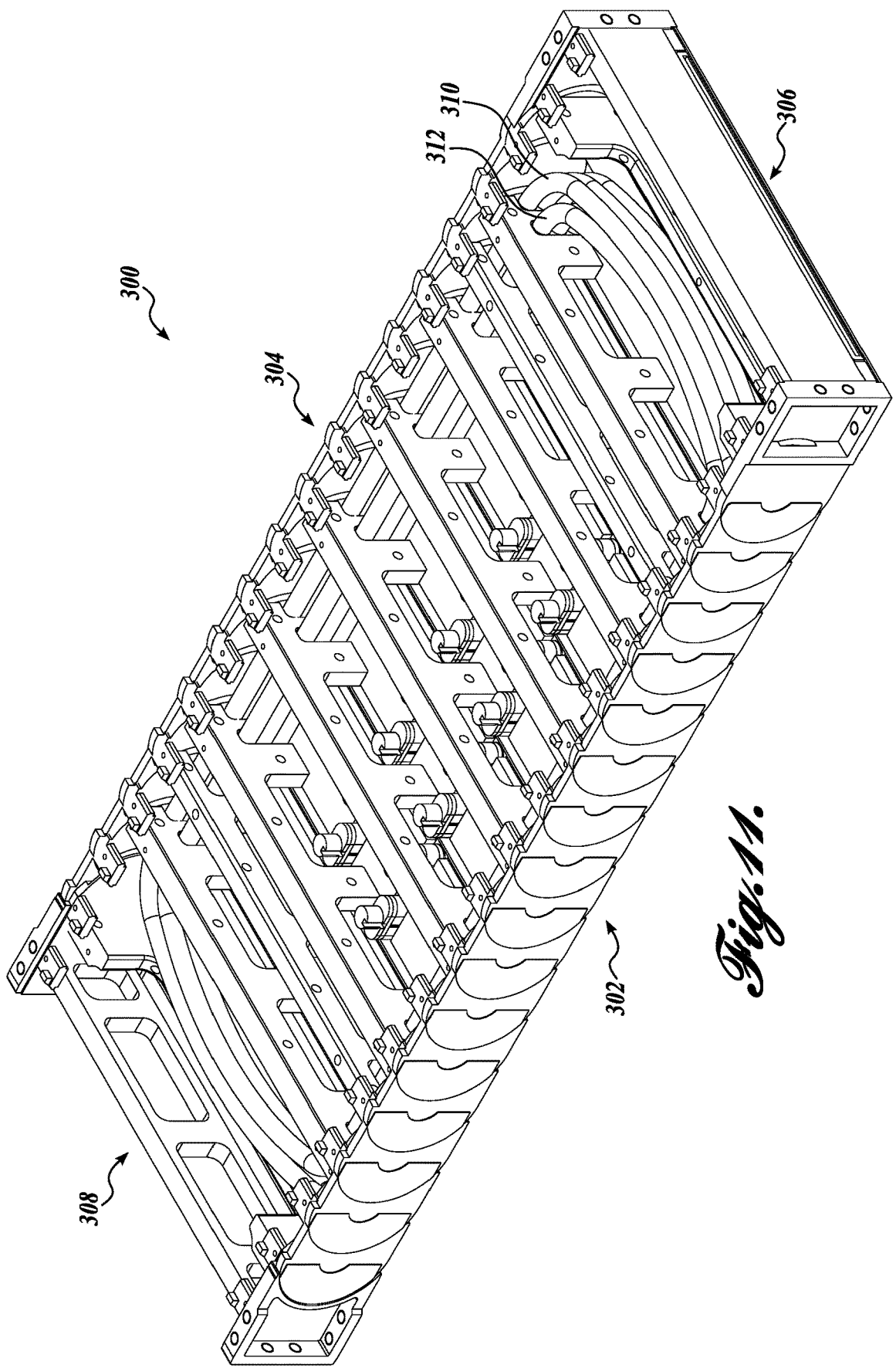
FIG. 11 is a diagrammatical illustration of one embodiment of a probe to detect corrosion on an insulated pipe.
Figure 12:
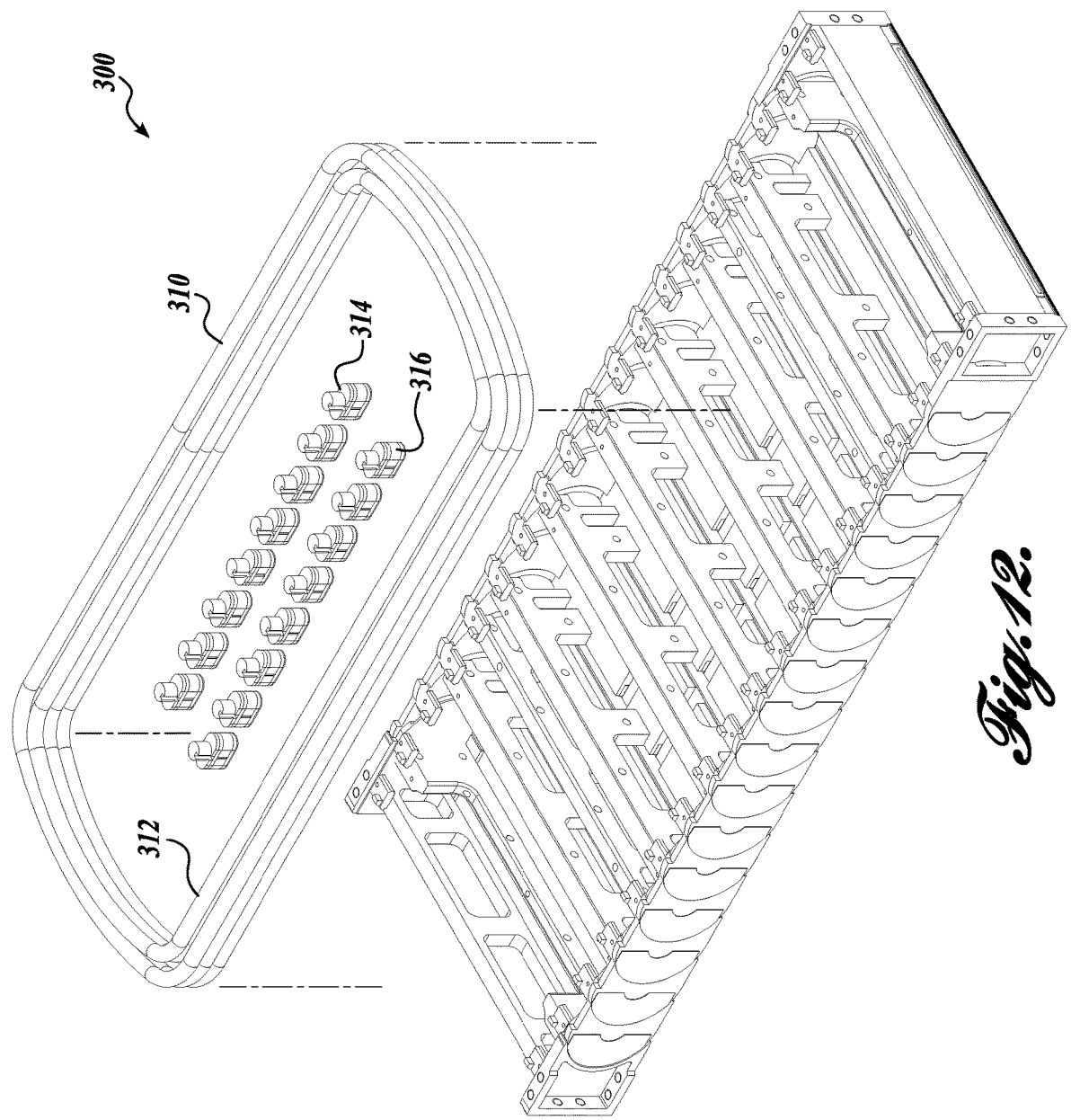
FIG. 12 is an exploded view of the probe of FIG. 11.

Referring to FIGS. 11 and 12, an embodiment of a probe 300 is illustrated. FIGS. 11 and 12 show the means configuration for testing encased pipe, such as pipe and other structures that are encased in insulation or fireproofing. FIG. 11 shows the probe 300 includes a plurality of links attached in series to one another. The links allow the probe 300 to wrap around a curved structure, such as a pipe. The links form a compartment for the placement of exciter means and detector means. The probe 300 compartment includes a first side wall 302, an opposite side wall 304, a first end wall 306, and an opposite end wall 308. The construction of the probe structure 300 is similar to that of the probe structure 200 described above.

Referring to FIG. 11, the probe 300 includes a first exciter means 310 and a second exciter means 312. As can be seen, the relationship between the first exciter means 310 and the second exciter means 312 is one of exterior and interior. In probe 300, the first exciter means 310 is located on the outside of the second (interior) exciter means 312. The first exterior exciter means 310 has windings that generally extend to the two sidewalls 302, 304 and to the two end walls 306, 308. The windings of the second interior exciter means 312 are therefore, placed adjacent to the inside of the windings of the first exterior exciter means 310.

The probe 300 includes a plurality of pairs of detector means. For example, detector means 314 is paired with detector means 316. The placement of detector means with respect to exciter means and other detector means is important. The distances between each of these components can be tuned to fit the amount of lift off, but in all cases, the space between exciter and detector means should not be more than 3" and the space between detector pairs should also not exceed 3". Each pair of detector means is placed within the windings of the second interior exciter means 312. The pairs of detector means extend along the length of the exciter means 310, 312, but on the inside of the windings. Further, the pairs of detector means are aligned along the length of the exciter means 310, 312.

FIG. 13 shows how the means are configured when the probe 300 is mounted on the exterior of an insulated curved structure, such as pipe 122. As the probe 300 wraps around the pipe 122, the exciter means 310, 312, and the pairs of detector means 314, 316, similarly curve around the pipe 122. In FIG. 14, the pairs of detector means 314, 316 are shown within the first exterior exciter means 310 and the second interior exciter means 312.

Figure 15:
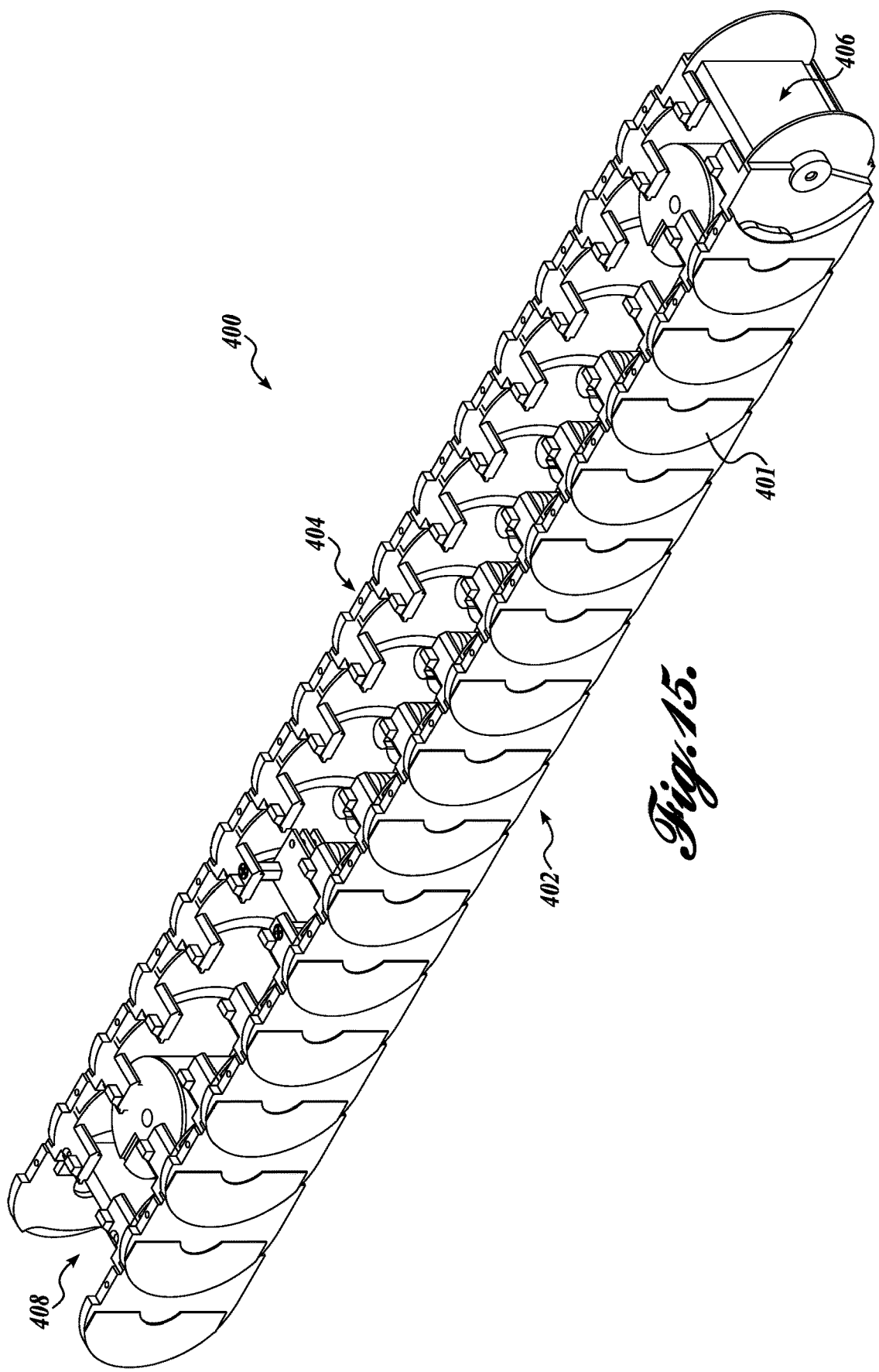
FIG. 15 is a diagrammatical illustration of one embodiment of a probe to detect corrosion on a bare or covered pipe, vessel, storage tank or sphere legs.
Figure 16:
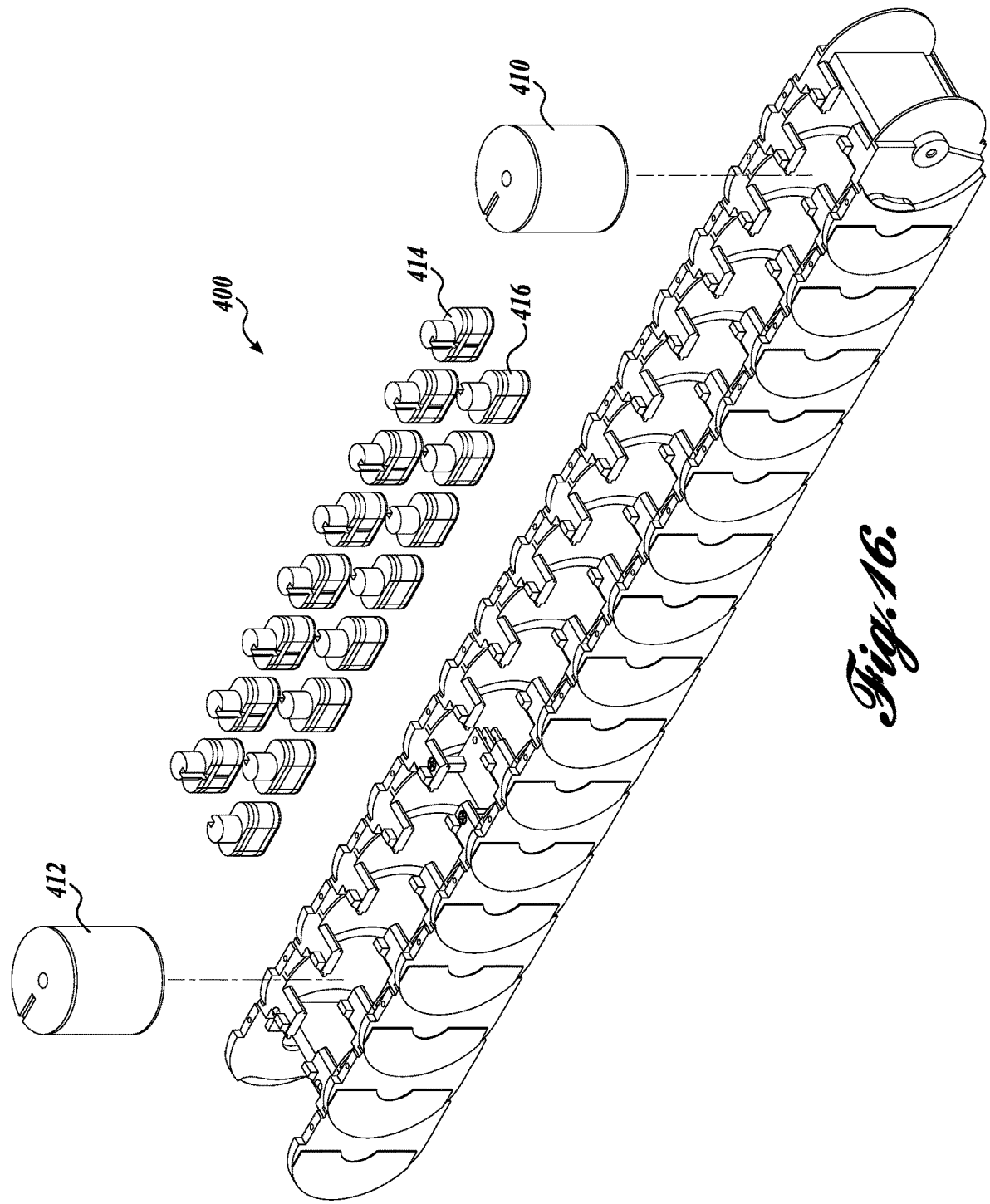
FIG. 16 is an exploded view of the probe of FIG. 15.

Referring to FIGS. 15 and 16, an embodiment of a probe 400 is illustrated. FIGS. 15 and 16 show the means configuration for testing encased pipe, such as pipe and other structures that are encased in insulation or fireproofing. FIG. 15 shows the probe 400 includes a plurality of links 401 attached in series to one another. The links 401 allow the probe 400 to wrap around a curved structure, such as a pipe. The links 401 form a compartment for the placement of exciter means and detector means. The links 401 may be manufactured from many different types of plastic, stainless steel, carbon fiber or similar materials. The probe 400 compartment includes a first side wall 402, an opposite side wall 404, a first end wall 406, and an opposite end wall 408. In this regard the structure of the probe 400 is similar to that of the probes 200 and 300, described above.

Referring to FIG. 16, the probe 400 includes a first exciter means 410 and a second exciter means 412. In probe 400, the first exciter means 410 is placed adjacent to end wall 406 and the second exciter means is placed adjacent to the opposite end wall 408.

The probe 400 includes a plurality of pairs of detector means 414, 416. For example, detector means 414 is paired with detector means 416. Each pair of detector means 414, 416 is placed between the first exciter means 410 and the second exciter means 412 so that the pairs 414, 416 are aligned along the length of the probe 400. The pairs of detector means extend along the length of the probe 400.

According to this disclosure, the specific placement of exciter means and detector means in the various probe embodiments create the interactions that determine how the eddy currents are generated and how the defects are detected. The placement and number of exciter means and detector means are configured to detect the magnetic field of eddy currents generated by the direct magnetic field of the exciter means. Defects can include, but are not limited, to corrosion, pitting, flaking, thin spots, voids, cracks, fissures, low density spots, and the like. The illustrated embodiments are representative of probes for testing applications of bare or insulated or fireproofed structures, such as piping.

As noted above, the probe 200 shown in FIGS. 7 and 8 is designed to inspect pipes and other structures without insulation, fireproofing, jacketing or other covering. In this regard the coils 210 and 212 of the probe 200 are designed and optimized to generate "low lift-off" magnetic fields to travel through the pipe wall 102 to reach the far side of the pipe wall and then returned back to the side of the pipe wall at which the probe is located. In this manner the probe is able to detect discontinuities on both the far side in near side of the pipe wall 102.

The probe 300 shown in FIGS. 11 and 12 is designed to inspect pipes 112 and other structures that have insulation, fireproofing, jacketing or other covering 122 applied thereto. As noted above, the probe 300 rides on the exterior of the covering 122, see FIGS. 3, 4, and 14. In this situation, the probe 300 inspects for defects on the near side of the pipe 112. In this regard, the configuration of the exciter coils 310 and 312 are designed and optimized for "high lift-off" to concentrate the magnetic field at the near side of the pipe 112 and with a minimum yield penetration through the pipe wall. The magnetic field pattern generated by the exciter coils 310 and 312 as high-sensitivity to detecting defects on the near side of the pipe 112 and minimal sensitivity to detecting defects on the far side of the wall of pipe 112.

The various probe embodiments of FIGS. 7-16 can use low frequency alternating current (AC) of about 100 hertz or less.

The various probe embodiments of FIGS. 7-16 can be held stationary or can be scanned along the surface of the insulated or non-insulated pipe.

The various probe embodiments of FIGS. 7-16 can be configured in the form of a flexible "bracelet" that conforms to any diameter of pipe, tank or pressure vessel, including flat steel plate. The mechanical links making up the probes are available from Mitsumi (us.misumi-ec.com)

The various probe embodiments of FIGS. 7-16 can scan and detect corrosion at inspection speeds between 1 and 30 feet per minute.

The various probe embodiments of FIGS. 7-16 provide for recording and displaying of data during the scan on a lap-top, tablet, desktop or other display device, and the data is subsequently analyzed by skilled technicians.

The various probe embodiments of FIGS. 7-16 can be equipped with wheels, spaced every few inches, which hold the device above the insulation or fireproofing so that screws, bands, cladding overlaps etc. do not impede the progress of the device during its scan.

The probe embodiments of FIGS. 7-16 include means(s) or sensors inside the probes that transmit an oscillating signal at low frequencies (1 Hz to 100 Hz) which couples to the ferromagnetic pipe material at distances (lift-off) up to 12".

In the probe embodiments of FIGS. 7-16, the signal in the pipe wall is detected by the detector means placed near the exciter means(s), but far enough away that the direct field, which expands in time and distance, does not couple directly to the detector means. Any direct field that does couple into the detection means is canceled using a differential means design which cancels the direct field while still retaining sensitivity to the field that is coming from the pipe. The detector means can detect the magnetic fields that result from eddy currents flowing in the pipe wall induced by the alternating magnetic field of the exciter means.

In the probe embodiments of FIGS. 7-16, detection can be done through coil means or solid state devices. The detector means in the probes can include copper means, Hall Effect, SQUID, GMI, Magnetometer, Magneto Resistance, Proton Precision, Flux Gate, or a combination. The EM field component may be any of the axial, circumferential or radial field component depending upon the design application. The detector means can include differential means. The detector and exciter means may be pancake type style where the windings are parallel to the pipe wall.

In the probe embodiments of FIGS. 7-16, the drive circuit can be located on the probe or can be housed in an electronics box that is remote from the probe.

In the probe embodiments of FIGS. 7-16, the probe can have sensing circuits and memory incorporated into the probe.

In the probe embodiments of FIGS. 7-16, the data from the detector means can be sent via wire or wireless means to the storage and data display unit.

Figure 17:
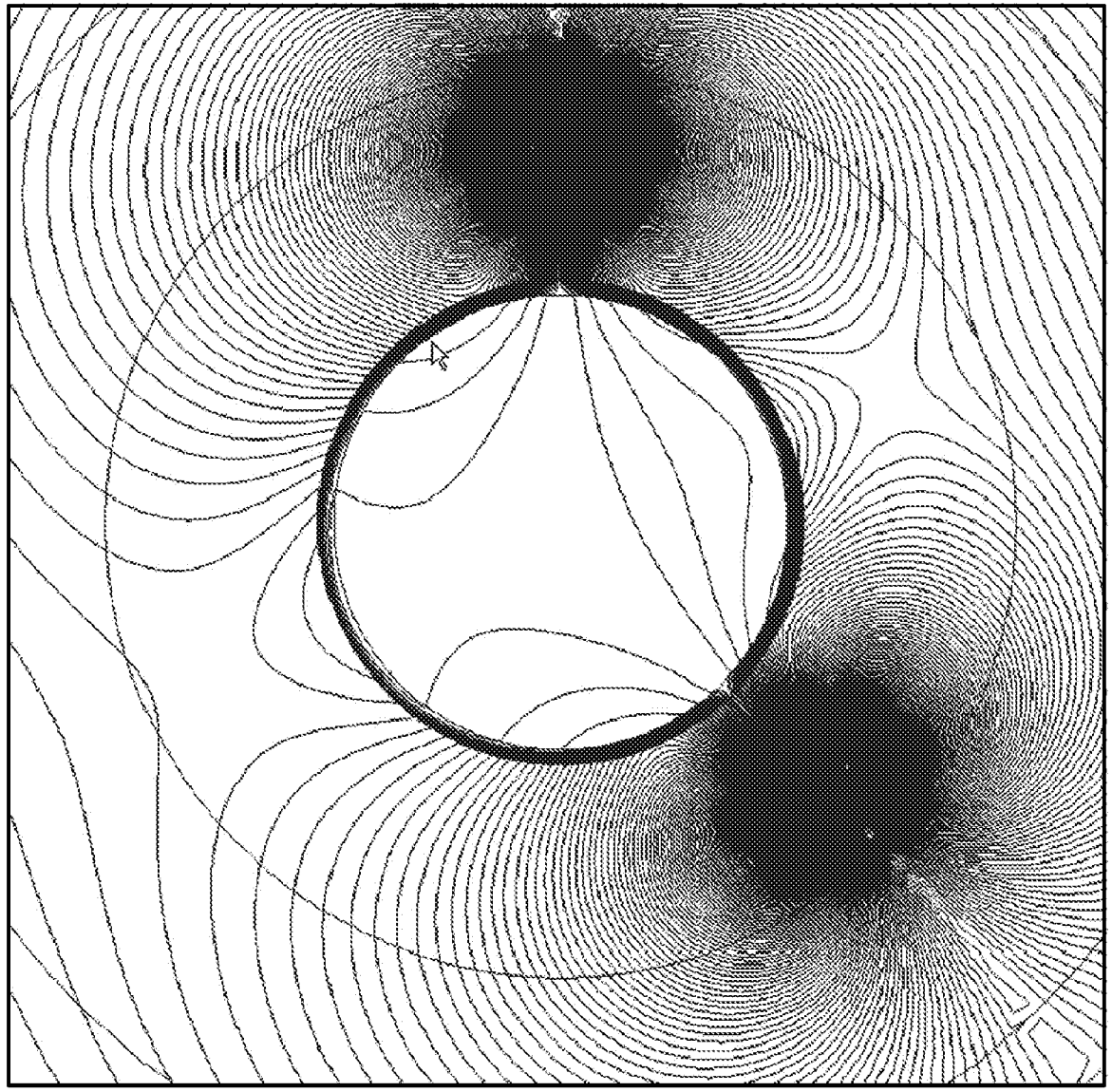
FIG. 17 is a finite element model plot of two exciters near a pipe.

In the probe embodiments of FIGS. 7-16, the probes can be robotically manipulated over the object being tested, including if the pipe is vertical, In FIG. 17 is a finite element model of how dual exciter means couple to the pipe (the dark circle in the center). The pipe wall is "full" of electromagnetic lines of flux which flow around the pipe away from the exciter means. There is also a large external field from the exciters, in air, and a "Through Transmission field inside the pipe. The concentration of the field within the walls of the pipe is the field that is sensitive to changes in the pipe wall thickness. Detectors placed between the exciters can detect perturbations in this field even at distances from the pipe of 3" or more.

Figure 18:
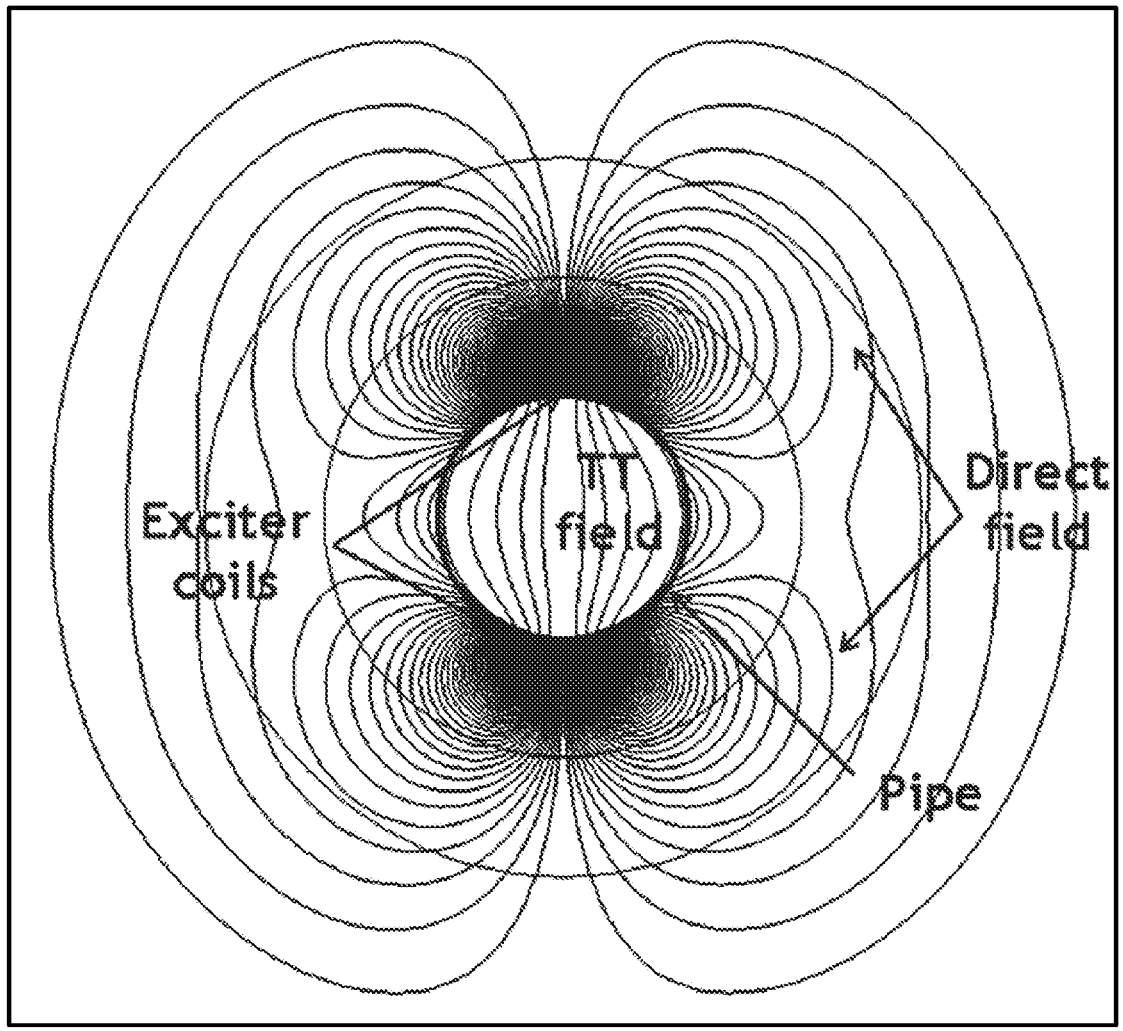
FIG. 18 is a finite element plot of the fields from two exciter means placed outside a pipe with the three fields labelled.

FIG. 18 is a finite element model plot of two exciters near a pipe, with the three fields labelled. There are two pancake exciter means near a pipe. It can be seen how the fields from the exciter means are concentrated within the walls of the pipe and also travel through the center of the pipe. All three components of the fields are changed when the pipe wall thickness and other characteristics (e.g., relative magnetic permeability) change.

FIG. 18 is a finite element plot of the fields from two exciter means placed outside a pipe. This shows the effect on the through transmission field; the field within the pipe wall; and the external field are all affected when the fields encounter a reduction of pipe wall thickness of 50% on the inside of the pipe. These perturbations can be detected from outside the pipe at considerable distances (practically, up to 3") from the pipe. They can also be detected with a detector placed inside the pipe (hence the term "through transmission field")

Figure 19:
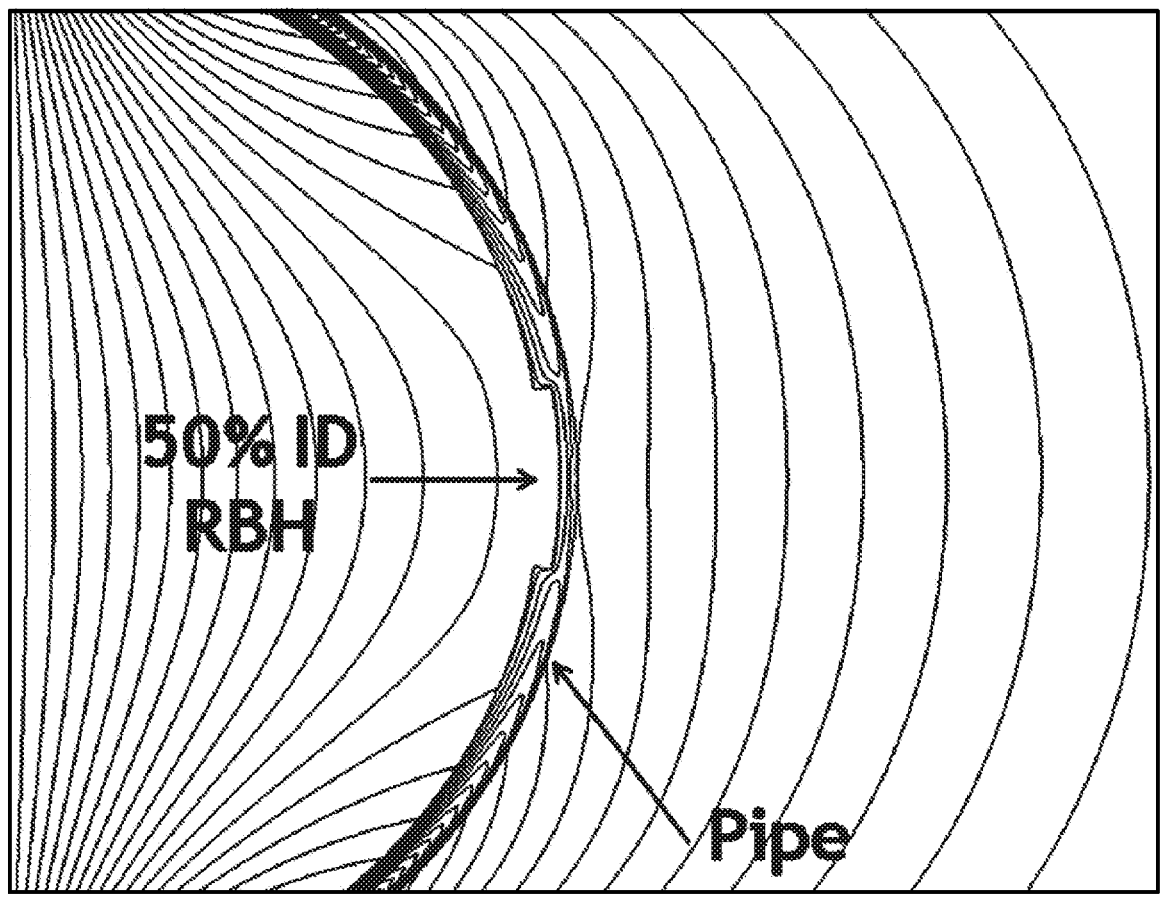
FIGS. 19 and 20 are finite element plots of the fields from two exciter means placed outside a pipe showing the field displacement in the presence of a wall loss defect.
Figure 20:
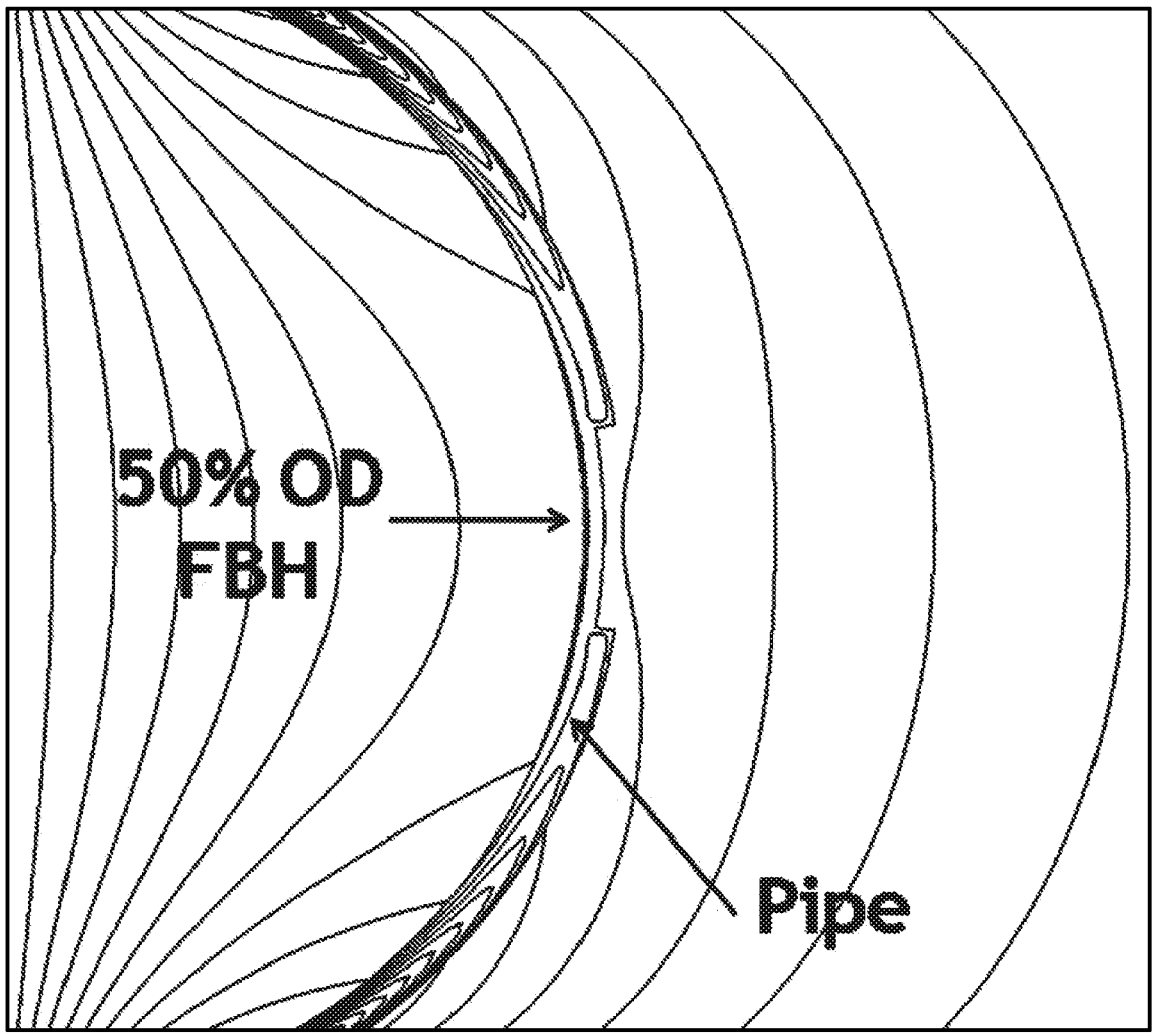

FIGS. 19 and 20 are finite element plots of the fields from two exciter means placed outside a pipe. This shows the effect on the through transmission field; the field within the pipe wall; and the external field are all affected when the fields encounter a reduction of pipe wall thickness of 50% on the outside (FIG. 19) or inside (FIG. 20) of the pipe.

In all embodiments, a probe (200, 300, 400) comprises a plurality of links connected together in series, wherein the plurality of links create a flexible compartment containing at least a first and second exciter means and at least one pair of detector means, wherein the exciter means are driven by an alternating current to produce an alternating magnetic field, and the detector means are configured to detect a magnetic field of an eddy current caused by the alternating exciter magnetic field.

In an embodiment, the detector means are placed at a distance from the exciter means, wherein a dominant field detected by the detector means is the eddy current magnetic field.

In an embodiment, the probe 200 comprises a first exciter means 210 adjacent to a side wall 204 of the probe compartment, a second exciter means 212 adjacent an opposite side wall 202 of the probe compartment, and a plurality of detector means pairs 214, 216 placed between the first and second exciter means 210, 212.

In an embodiment, the first exciter means 210 occupies about one third to one fourth of a width of the compartment, the second exciter means 212 occupies about one third to one fourth of the width of the compartment, and a plurality of detector means pairs 214, 216 are placed along the center of the compartment.

In an embodiment, the probe 300 comprises a first exciter means 310 that extends adjacent to a first side wall 304, an opposite side wall 302, a first end wall 308, and a second end wall 306 of the probe compartment, a second exciter means 312 placed inside and adjacent of the first exciter means 310, and a plurality of detector means pairs 314, 316 placed within the second exciter means 312.

In an embodiment, the plurality of detector means pairs 314, 316 are placed along the center of the compartment.

In an embodiment, the probe 400 comprises a first exciter means 410 placed adjacent a first end wall 406 of the probe compartment, a second exciter means 412 placed adjacent a second end wall 408 of the probe compartment, and a plurality of detector means pairs 414, 416 placed between the first and the second exciter means 410, 412.

In an embodiment, the first exciter means 410 is adjacent to a first side wall 404 and adjacent to an opposite second side wall 402 of the compartment, the second exciter means 412 is adjacent to the first side wall 404 and adjacent to the opposite second side wall 402 of the compartment, and a plurality of detector means pairs 414, 416 are placed along the center of the compartment.

In an embodiment, the exciter means of probes 200, 300, 400 can use an alternating current frequency of 1 hertz or less.

In an embodiment, a method of detecting defects in a structure, comprises placing the probe 200, 300, 400 on an exterior of a structure 102; moving the probe on the structure in a direction; while moving the probe, producing a direct magnetic field with exciter means driven by an alternating current and detecting a magnetic field of an eddy current caused by the direct magnetic field with detector means.

In an embodiment, the direction of moving the probe 200, 300, 400 includes a longitudinal direction or circumferential direction or both longitudinal and circumferential direction.

In an embodiment, the structure 102 is made from carbon steel.

In an embodiment, the alternating current frequency is sub-1 hertz to 100 Hz.

In an embodiment, the detector means of probe 200, 300, 400 are placed at a distance from the exciter means, wherein a dominant field detected by the detector means is the eddy current magnetic field that is flowing in the carbon steel part.

In an embodiment, the exterior of the structure 102 is lacking insulation or fireproofing, and the probe 200 comprises a first exciter means 210 adjacent to a side wall 204 of the probe compartment, a second exciter means 212 adjacent an opposite side wall 202 of the probe compartment, and a plurality of detector means pairs 214, 216 placed between the first and second exciter means 210, 212.

In an embodiment, the first exciter means 210 occupies about one third to one fourth of the width of the compartment, the second exciter means 212 occupies about one third to one fourth of the width of the compartment, and a plurality of detector means pairs 214, 216 are placed along the center of the compartment.

In an embodiment, the exterior of the structure 112 has insulation or fireproofing 122, and the probe 300 comprises a first exciter means 310 that extends adjacent to a first side wall 304, an opposite side wall 302, a first end wall 308, and a second end wall 306 of the probe compartment, a second exciter means 312 placed inside and adjacent of the first exciter means 310, and a plurality of detector means pairs 314, 316 placed within the second exciter means 312.

In an embodiment, the plurality of detector means pairs 314, 316 are placed along the center of the compartment.

In an embodiment, the structure 102 includes a tubular structure, and the probe 100, 200, 300, 400 wraps around the tubular structure for less than an entire circumference of the structure.

In an embodiment, the probe 200, 300, 400 includes a plurality of links connected together in series making the probe flexible along a length of the probe.

While illustrative embodiments have been illustrated and described, it will be appreciated that various changes can be made therein without departing from the spirit and scope of the invention.

The embodiments of the invention in which an exclusive property or privilege is claimed are defined as follows:

1. A probe for ascertaining a physical condition of elongate, tubular ferromagnetic structures of varying transverse sizes, comprising:
   a plurality of links connected together in series to cooperatively define a flexible compartment capable of assuming the curvature of the structure being investigated, the compartment containing at least a first and second exciter means and at least one pair of detector means, wherein the exciter means are driven by an alternating current to produce a direct magnetic field, and the detector means are configured to detect a magnetic field of an eddy current caused by the direct magnetic field;
   connectors configured to pivotally interconnect adjacent links to permit the flexible compartment to conform to the transverse size of the tubular structures to closely overlie and partially circumferentially wrap the tubular structures being examined; and
   the flexible compartment defining opposed continuous sidewalls extending along the length of the compartment to form protective sidewalls for the interior of the compartment.

2. The probe of claim 1, wherein the detector means are separated from the exciter means.

3. The probe of claim 1, wherein:
the flexible compartment defining opposed side walls extending along the compartment; and
the first exciter means being elongated and extending along a plurality of links and adjacent to a side wall of the probe compartment, the second exciter means being elongated and extending along a plurality of links and adjacent an opposite side wall of the probe compartment, and a plurality of detector means pairs of the at least one pair of detector means are placed between the first and second exciter means.

4. The probe of claim 3, wherein the first exciter means occupies about one third to one fourth of a width of the compartment, the second exciter means occupies about one third to one fourth of the width of the compartment, and the plurality of detector means pairs are placed along the center of the compartment.

5. The probe of claim 1, wherein the first exciter means extends adjacent to a first side wall, an opposite side wall, a first end wall, and a second end wall of the probe compartment, the second exciter means is placed inside and adjacent of the first exciter means, and the plurality of detector means pairs of the at least one pair of detector means are placed within the second exciter means.

6. The probe of claim 5, wherein the plurality of detector means pairs are placed along the center of the compartment.

7. The probe of claim 1, wherein the first exciter means is placed adjacent a first end wall of the probe compartment, the second exciter means is placed adjacent a second end wall of the probe compartment, and a plurality of detector means pairs of the at least one pair of detector means are placed between the first and the second exciter means.

8. The probe of claim 7, wherein the first exciter means is adjacent to a first side wall and adjacent to an opposite second side wall of the compartment, the second exciter means is adjacent to the first side wall and adjacent to the opposite second side wall of the compartment, and the plurality of detector means pairs are placed along the center of the compartment.

9. The probe of claim 1, wherein a frequency of the alternating current is sub 1 hertz to 100 Hz.

10. A method of detecting defects in the tubular structure of claim 1, comprising:
placing the probe of claim 1 on an exterior of the tubular structure;
moving the probe on the tubular structure in a direction; while moving the probe, producing an alternating magnetic field with the exciter means driven by an alternating current and detecting the magnetic field of the eddy current caused by the alternating magnetic field with the detector means.

11. The method of claim 10, wherein the direction includes a longitudinal direction or circumferential direction or both the longitudinal and circumferential directions relative to the structure.

12. The method of claim 10, wherein the structure is made from carbon steel, ductile iron, cast-iron or pre-stressed concrete cylinder (PCCP) pipe.

13. The method of claim 10, wherein a frequency of the alternating current is sub 1 hertz to 100 Hz.

14. The method of claim 10, wherein the detector means are placed at a distance from the exciter means, wherein the field detected by the detector means is the magnetic field of the eddy current.

15. The method of claim 10, wherein the exterior of the tubular structure is lacking insulation or fireproofing, and the first exciter means is adjacent a side wall of the probe compartment, the second exciter means is adjacent an opposite side wall of the probe compartment, and a plurality of detector means pairs of the at least one pair of detector means are placed between the first and second exciter means.

16. The method of claim 15, wherein the first exciter means occupies about one third to one fourth of the width of the compartment, the second exciter means occupies about one third to one fourth of the width of the compartment, and the plurality of detector means pairs of the at least one pair of detector means are placed along the center of the compartment.

17. The method of claim 10, wherein the exterior of the structure has insulation or fireproofing, and the first exciter means extends adjacent a first side wall, an opposite side wall, a first end wall, and a second end wall of the probe compartment, the second exciter means is placed inside and adjacent of the first exciter means, and the plurality of detector means pairs of the at least one pair of detector means are placed within the second exciter means.

18. The method of claim 17, wherein the plurality of detector means pairs are placed along the center of the compartment.

* * * * *